United States Patent [19]

Campbell et al.

[11] Patent Number: 4,862,998
[45] Date of Patent: Sep. 5, 1989

[54] SELF-ENERGIZING DISC BRAKES

[75] Inventors: Roy Campbell, Worcestershire, England; Andrew P. Green; Anthony G. Price; David Parry, all of Gwent, Great Britain

[73] Assignee: Lucas Industries public limited company, England

[21] Appl. No.: 196,370

[22] Filed: May 19, 1988

[30] Foreign Application Priority Data

May 29, 1987 [GB] United Kingdom ............... 8712711
Sep. 17, 1987 [GB] United Kingdom ............... 8721900

[51] Int. Cl.⁴ ..................... F16D 55/08; F16D 65/80
[52] U.S. Cl. .......................... 188/71.6; 188/71.4; 188/73.2; 188/264 D; 188/264 E; 188/264 F; 188/264 P
[58] Field of Search ............... 188/73.2, 71.4, 71.5, 188/264 B, 264 D, 264 P, 264 F, 264 E, 264 CC, 71.6

[56] References Cited

U.S. PATENT DOCUMENTS 4,023,656  5/1977  Kuwahara et al. ............ 188/264 B
4,210,229  7/1980  Rees ............................... 188/71.4
4,383,593  5/1983  Micke ............................. 188/71.4
4,624,353 11/1986  Sailer et al. .............. 188/264 D X
4,702,351 10/1987  Price et al. ..................... 188/71.4

Primary Examiner—Andres Kashnikow
Assistant Examiner—Matthew C. Graham
Attorney, Agent, or Firm—Oldham & Oldham Co.

[57] ABSTRACT

In a self-energizing disc brake of the spreading type the actuator mechanism incorporates a restrictor in the form of a circumferentially extending discontinuous oil-seal which co-operates with radial faces on the two pressure plates. A secondary, or elevated, reservoir for liquid is therefore defined between said pressure plates by said oil-seal. Liquid can escape from this reservoir in order to enhance the cooling of the braking surfaces, defined by engagement of rotatable friction discs with end faces of a housing, pressure plates and a planar non-rotatable disc. In the brake shown in FIG. 6 two annular members act as seals on the ends of the outermost friction discs.

12 Claims, 3 Drawing Sheets

SELF-ENERGIZING DISC BRAKES

This invention relates to self-energising disc brakes of the kind in which rotatable friction discs provided with lining of friction material are adapted to be brought into engagement with spaced opposed braking surfaces in a housing by an actuator mechanism comprising a pair of annular pressure plates located between the friction discs and centered by stationary pilot lugs, and balls or rollers located in co-operating oppositely inclined recesses in the adjacent faces of the pressure plates, the application of the brake is initiated by moving the pressure plates angularly in opposite directions, and the pressure plates then move apart, due to the tendency for the balls or rollers to ride up ramps defined by the edges of the recesses, and into engagement with the friction discs which are urged into engagement with the braking surfaces, the pressure plates being carried round with the friction discs until one is arrested by the engagement of a lug on the plate with a drag-taking stop abutment in the housing, and the continued angular movement of the other pressure plate providing a servo action.

Self-energising brakes of the kind set forth may be dry or they may be of the liquid cooled type, and such brakes are commonly used in tractors and like vehicles and are hereinafter called brakes of the kind set forth.

In brakes of the kind set forth it is known that high temperatures at the braking faces causes degradation of the linings of friction material, especially when non-metallic linings of organic materials are utilised, rather than the more conventional linings of inorganic metallic materials. Such lining failure is particularly evident in those brakes of the kind set forth in which at least two friction discs are disposed between the actuator mechanism and the adjacent braking surface, and a non-rotatable intermediate spacer disc is disposed between the adjacent linings of those discs, the spacer discs comprising a metal plate keyed to the housing for relative sliding movement in an axial direction.

When brakes of the kind set forth are of the liquid cooled type they may be cooled by liquid flowing through the gearbox and other transmission parts of the vehicle. To minimise parasitic drag, particularly when the oil is cool, and consequent loss of power, it is preferable to maintain the level of oil in the gearbox at a minimum, rather than at a maximum, level. Since such a volume of oil is often in sufficient to provide adequate cooling of the braking faces, consequent degradation of the linings as discussed above may occur.

It is known in brakes of the kind set forth to provide slots or grooves in the friction linings themselves in order to facilitate cooling itself, and in particular when the brake is of the liquid cooled type, the slot or grooves are so chosen as to act as a reservoir for cooling liquid and to control the flow of liquid across the braking faces.

According to our invention, in a self energising disc brake of the kind set forth the actuator mechanism is provided with restrictor means to restrict the flow of cooling liquid from between the pressure plates in a radially outwards direction.

The space between the pressure plates therefore defines a secondary elevated reservoir from which liquid escapes to the friction discs in order to enhance cooling of the braking surfaces.

Conveniently the restrictor means comprises a circumferentially extending member which is disposed within the actuator mechanism for co-operation with radial faces on the two pressure plates and which opens towards the upper end of the brake. The liquid is directed into the secondary reservoir by suitable means, and its release from the secondary reservoir is restricted by the circumferentially extending member. For example the means may comprise a supply nozzle located in an upper region of the housing of the brake, adjacent to the outer peripheral edges of the pressure plates. Alternatively the means may comprise an integral pump disposed within the brake.

The circumferentially extending member may comprise a discontinuous ring of elongate section provided at opposite ends with locations, each for co-operation with one of the plates to prevent angular movement of the ring with respect to that plate when the brake is applied, and the liquid is directed between the spaced upper ends of the ring.

Two annular members may also be included in the brake construction in such a way to seal the ends of the rotatable braking members, thereby defining a reservoir inside the brake assembly itself. The running clearances between the plates when the brake is not applied allow the oil to flow away without building up pressure and causing drag on the end plates.

Some embodiments of our invention are illustrated in the accompanying drawings in which:

FIG. 3 is a section through the pressure plates but showing a modification;

FIG. 4 is a view similar to FIG. 3 but showing another modification;

FIG. 5 is a view similar to FIG. 1 but showing a modification; and

Figure 1:
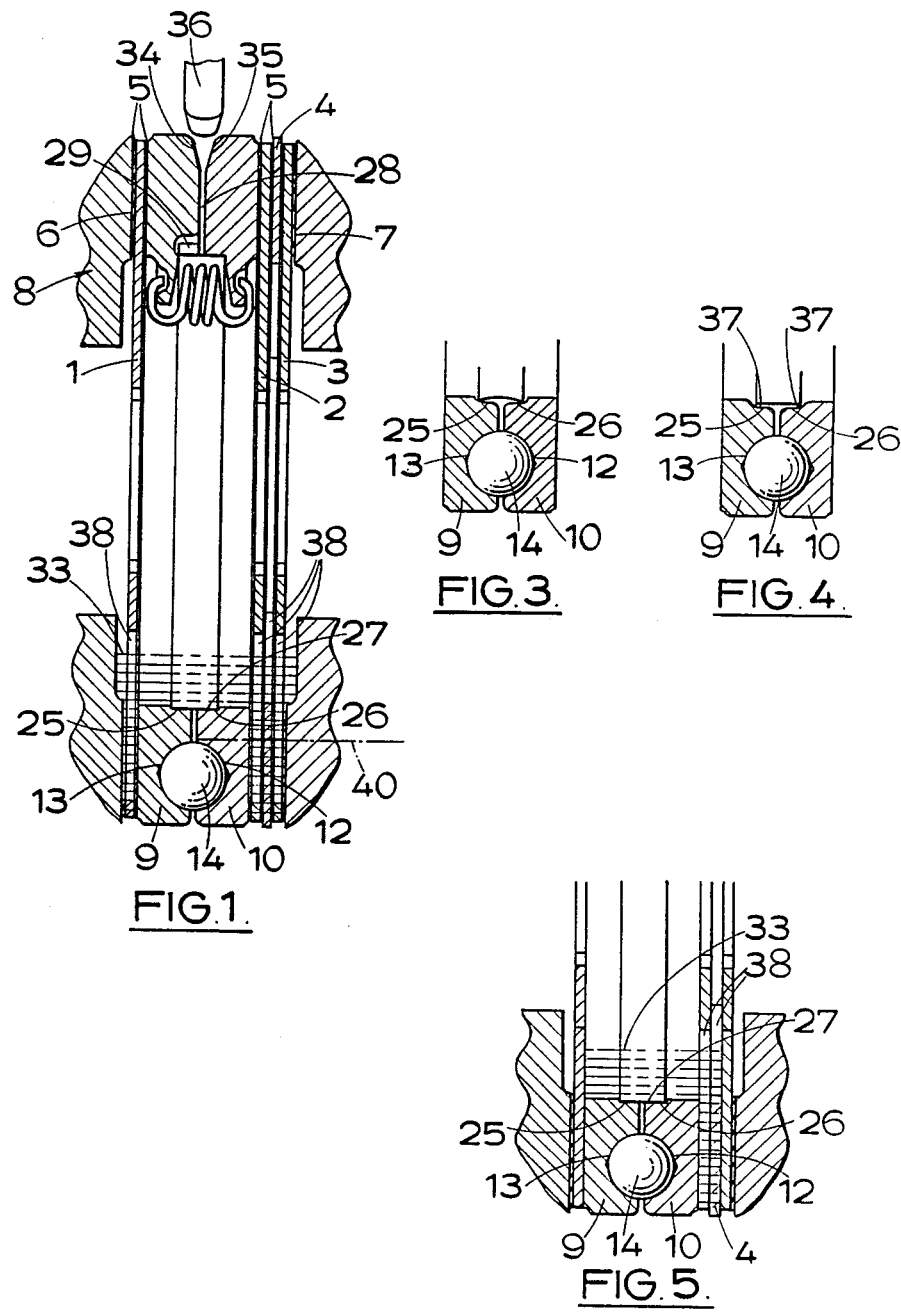
FIG. 1 is a longitudinal section through a liquid-cooled brake of the kind set forth.
Figure 2:
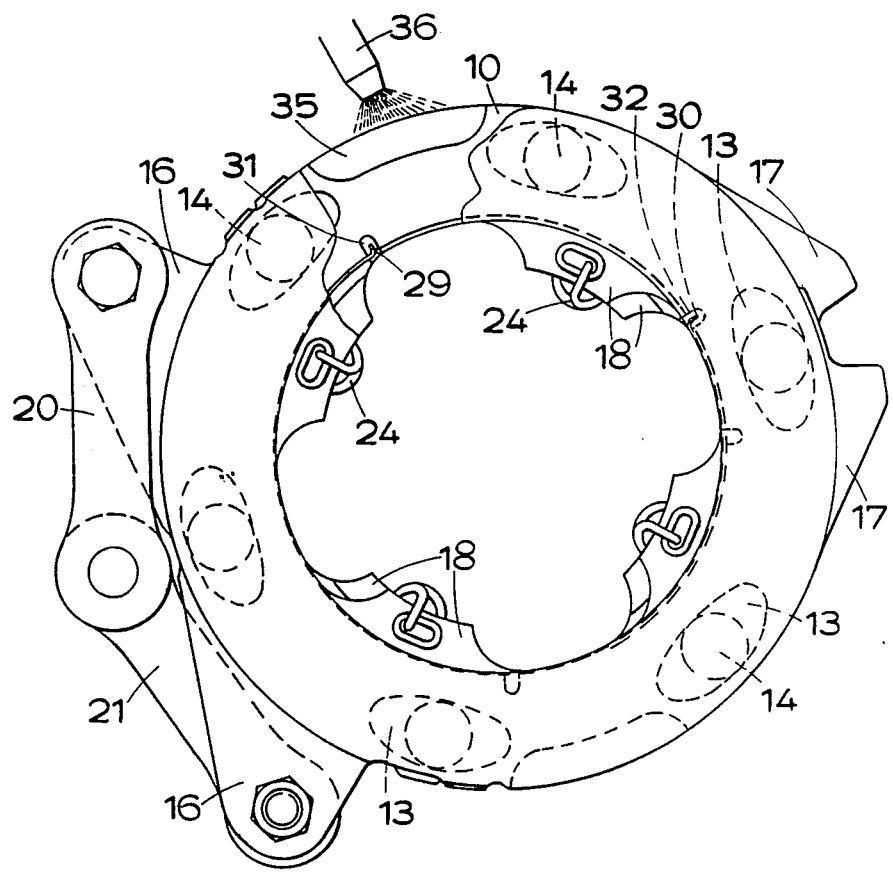
FIG. 2 is an end view of the brake of FIG. 1.

The brake illustrated in FIGS. 1 and 2 of the drawings is of a spreading type in which three rotatable friction discs 1, 2, 3 are splined for sliding movement on a rotatable shaft (not shown). A stationary planar disc 4 is disposed between the friction discs 2, 3 and is keyed to a housing 8. Each rotatable disc 1, 2, 3 is provided on opposite sides with linings 5 of a metallic or non-metallic friction material adapted to be brought into engagement with spaced opposed radial surfaces 6, 7 in the housing 8, and opposite faces of the disc 4, by pressure plates 9, 10 located between an adjacent pair of the discs 1, 2 and centered by three angularly spaced stationary pilots (not shown) of which one comprises a drag-taking pin. Balls 14 are located in co-operating oppositely inclined recesses 12, 13 in the adjacent faces of the pressure plates 9, 10 and which the pressure plates 9, 10 constitute an actuator mechanism.

The two pressure plates 9 and 10 are similar in construction. Each plate is generally of annular outline provided with a pair of outwardly extending radial lugs 16 and 17, and a plurality of inwardly extending radial lugs 18. The lug 16 is provided adjacent to its outer end with an opening by which one of a pair of toggle links 20, 21 is coupled in order to initiate application of the brake when the outer ends of the toggle links are withdrawn relatively from the housing 8 by means of a pull-rod. The lug 17 acts to co-operate with the pin to arrest rotation of the plate 10 in the application of the brake. Superimposed pairs of the lugs 18 provide anchorages for opposite ends of tension return springs 24 which urge the pressure plates 9, 10 towards each other with the balls 14 held at the bases of ramps defined by end faces of the recesses 12, 13.

The pressure plates 9, 10 are provided at their inner ends with radial sealing faces 25, 26 defined by the bases of superimposed shallow recesses, and an oil seal comprising a flat circumferentially extending discontinuous ring 27 co-operates with the sealing faces so that the part circular space 28 defined between the pressure plates 9, 10 and the ring 27 constitutes a secondary elevated reservoir for liquid, suitably oil. Tags 29 and 30 at opposite ends of on the ring 27 are received in pockets 31, 32 in the plates 9, and 10 respectively to anchor the ring against relative rotation. The pockets 31, 32 are disposed in the pressure plates 9, 10 well above the shaft, and the circumferential lengths of the pockets is sufficient to accommodate relative angular movement between the pressure plates in the application of the brake.

The housing defines a main reservoir which contains liquid to a level 40, and the elevated secondary reservoir contains liquid to the depth 33. At least the arcuate lowermost portions of the friction discs and the pressure plates are immersed in the secondary reservoir to the depth 33.

In addition superimposed circumferentially extending recesses 34, 35 are provided in adjacent faces of the two pressure plates 9, 10 to define a chamber into which liquid from the main reservoir can be discharged from a nozzle 36 and into the upper end of the secondary or elevated reservoir.

In a modification liquid is supplied to the elevated reservoir by means of an integral pump disposed within the brake.

The application of the brake is initiated by moving the pressure plates 9, 10 angularly in opposite directions by withdrawing the pull-rod from the housing 8. This causes the pressure plates 9, 10 to move axially relatively away from each other due to the tendency for the balls 14 to ride up the ramps defined by the end faces of the recesses 12, 13. This urges the friction discs 1 and 3 into engagement with the radial surfaces 6 and 7 on the housing 8. The pressure plates 9 and 10 are then carried round with the discs 1, 2 until one, say the plate 10, is arrested by the engagement of the lug 17 with a drag-taking abutment defined by the pin, whereafter continued angular movement of the outer plate 9 provides a servo action.

The oil seal 27 acts to restrict flow through the actuator mechanism so as to encourage flow onto the friction discs 1, 2 and 3, and especially onto the planar disc 4, whereby to enhance the cooling of the braking surfaces. As illustrated all the discs are provided with angularly spaced oil-circulation holes 38, suitably radial slots, to facilitate the flow onto the linings and braking faces.

In the modified construction illustrated in FIG. 3 the ring 27 is of arcuate, concave outwardly directed, cross-section so that the ends of the ring co-operate with the adjacent ends of the recesses to enhance the sealing effect of the ring.

In the modification shown in FIG. 4, the end edges 37 of the ring are deformed outwardly to co-operate with the sealing faces 25 and 26.

Figure 6:
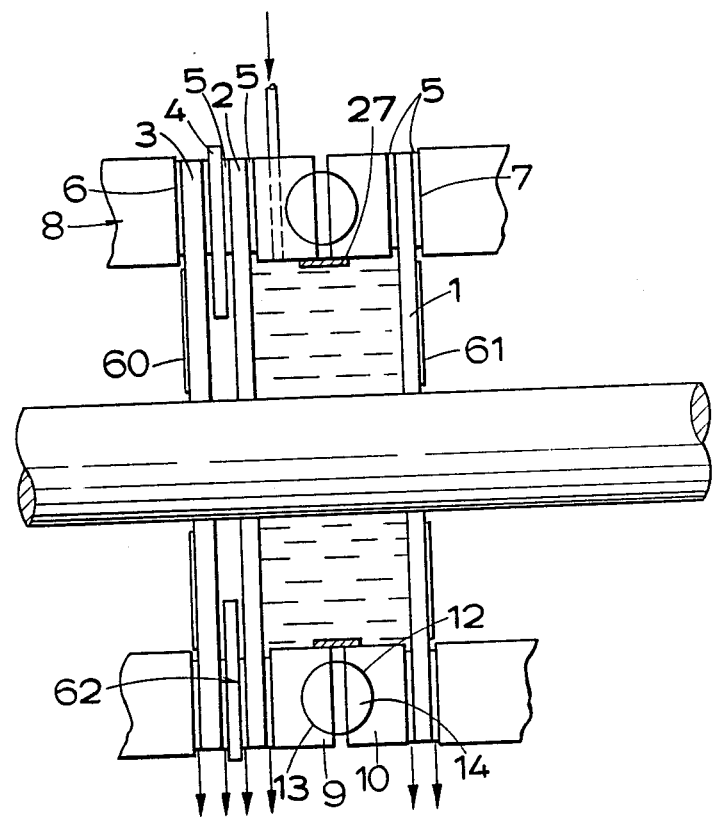
FIG. 6 is a view similar to FIG. 1 but showing yet another modification.

In the modification shown in FIG. 6, two annular members 60, 61 act as seals on the ends of the rotatable braking members 1, 3. As all of the exits apart from the lining groove portion 62 are sealed, a reservoir of oil can be retained inside the brake, and thus a high internal oil level is maintained is feed the lining grooves 62. The running clearances between the plates 2, 3, 4 when the brake is not applied, allow the oil to flow away without building up pressure and causing drag on the end plates.

In the brakes described above, when the brakes are applied, the planar disc 4 will be raised to a higher temperature than the discs 1, 2 and 3, especially if the discs 1, 2 and 3 are provided with non-metallic linings. The cooling of the planar disc 4 is therefore of paramount importance. The oil circulation holes 38 may therefore be arranged in the friction disc and to encourage oil flow the elevated reservoir towards the planar disc 4.

As shown in FIG. 5 this may be achieved by omitting the oil circulation holes 38 from the two outermost friction discs 1 and 3. The two discs 1 and 3 are therefore imperforate, and the oil tends to be trapped between them, whereby to concentrate its cooling effect on the planar disc 4.

We claim:

1. A self-energising liquid cooled disc brake comprising a housing, spaced, opposed radial braking surfaces in said housing, stationary radial pilot lugs in said housing, an actuator mechanism comprising first and second annular pressure plates centered on said pilot lugs, adjacent faces of said pressure plates being provided with co-operating oppositely inclined angularly spaced recesses, balls or rollers located in said recesses, rotatable friction members disposed between each said pressure plate and an adjacent radial braking surface, each member comprising a disc and first and second linings of friction material for engagement with said pressure plate and said radial surface carried by opposite faces of said discs, and means for moving said pressure plates angularly in opposite directions relative to said housing to initiate application of said brake, said pressure plates also moving axially to urge the friction member into engagement with said radial surface due to a tendency for said balls or rollers to ride up ramps defined by end faces of said recesses, said pressure plates thereafter being carried round with said friction discs until one of said pressure plates is arrested by a lug on said plate engaging a drag-taking stop abutment in said housing, the continued angular movement of the second said pressure plate providing a servo-action, said actuator mechanism being provided with a restrictor means to restrict the flow of cooling liquid in a radially outward direction between said pressure plates, wherein a secondary elevated reservoir, from which liquid escapes to said friction members to enhance cooling of said radial braking surfaces, is defined by a space between said first and second pressure plates.

2. A self-energising disc brake according to claim 1, wherein a supply nozzle is located adjacent to the outer peripheral edge of said pressure plates in an upper part of said housing, said supply nozzle directing liquid into said secondary reservoir.

3. A self-energising disc brake according to claim 1, wherein an integral pump is disposed within the brake to direct liquid into said secondary reservoir.

4. A self-energising disc brake according to claim 1, wherein said restrictor means comprises said actuator mechanism and a circumferentially extending member disposed with said actuator mechanism and co-operating radial faces on said first and second pressure plates, said circumferentially extending member opening towards the upper end of said brake and restricting the release of liquid from said secondary elevated reservoir.

5. A self-energising disc brake according to claim 3 wherein said circumferentially extending member comprises a discontinuous ring of elongate section provided at opposite ends with tags, said tags being received in pockets in said annular pressure plates to prevent angular movement of said discontinuous ring with respect to said pressure plates when the brake is applied, said liquid being directed between the spaced upper ends of said discontinuous ring.

6. A self-energising disc brake according to claim 5, wherein said discontinuous ring has an arcuate concave, outwardly directed, cross-section such that the ends of said ring co-operate with adjacent ends of said recesses to enhance the sealing effect of the ring.

7. A self-energising disc brake according to claim 5, wherein the peripheral edges of said discontinuous ring are outwardly deformed to co-operate with sealing faces of said pressure plates.

8. A self-energising disc brake according to claim 5, wherein said rotatable discs and a stationary planar disc are provided with angularly spaced liquid circulation holes to facilitate the flow of said liquid onto said linings and said braking surfaces.

9. A self-energising disc brake according to claim 8, wherein the outermost friction discs are imperforate, trapping said liquid between said outermost friction discs and concentrating its cooling effect on said planar disc.

10. A self-energising disc brake according to claim 9, wherein said discontinuous ring has an arcuate, concave, outwardly directed, cross-section such that the ends of said ring co-operate with adjacent ends of said recesses to enhance the sealing effect of the ring.

11. A self-energising disc brake according to claim 9, wherein the peripheral edges of said discontinuous ring are outwardly deformed to co-operate with sealing faces of said pressure plates.

12. A self-energising disc brake according to claim 5, wherein two annular members seal the ends of said rotatable braking members and define a reservoir inside the brake assembly, the running clearances between said annular pressure plates when the brake is not applied allowing said liquid to flow away without building up pressure and causing drag on said annular braking forces.

* * * * *